(12) United States Patent
Long et al.

(10) Patent No.: US 10,907,494 B2
(45) Date of Patent: Feb. 2, 2021

(54) PARALLEL HYBRID PROPULSION SYSTEM

(71) Applicant: Rolls-Royce North American Technologies Inc., Indianapolis, IN (US)

(72) Inventors: Stephen Andrew Long, Carmel, IN (US); Dwayne Bevis, Bloomington, IN (US); Graham Burkholder, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 16/399,545

(22) Filed: Apr. 30, 2019

(65) Prior Publication Data

US 2020/0347743 A1 Nov. 5, 2020

(51) Int. Cl.
| | |
|---|---|
| *F01D 15/10* | (2006.01) |
| *F02C 7/36* | (2006.01) |
| *B64D 27/02* | (2006.01) |
| *B64D 31/06* | (2006.01) |
| *B64D 27/10* | (2006.01) |
| *F02C 6/00* | (2006.01) |
| *F01D 17/24* | (2006.01) |

(52) U.S. Cl.
CPC .............. *F01D 15/10* (2013.01); *B64D 27/02* (2013.01); *B64D 27/10* (2013.01); *B64D 31/06* (2013.01); *F01D 17/24* (2013.01); *F02C 6/00* (2013.01); *F02C 7/36* (2013.01); *B64D 2027/026* (2013.01); *F05D 2220/323* (2013.01); *F05D 2270/13* (2013.01); *F05D 2270/20* (2013.01)

(58) Field of Classification Search
CPC .. F01D 15/10; F01D 17/24; F02C 6/00; F02C 7/36; B64D 27/02; B64D 27/10; B64D 31/06
See application file for complete search history.

(56) References Cited

U.S. PATENT DOCUMENTS

| | | | |
|---|---|---|---|
| 9,164,848 B2* | 10/2015 | Sartore | G06F 1/305 |
| 9,764,848 B1 | 9/2017 | Vondrell et al. | |
| 2016/0023773 A1* | 1/2016 | Himmelmann | H02M 5/458 60/778 |
| 2017/0145925 A1* | 5/2017 | Kusumi | F02C 6/18 |
| 2017/0320586 A1* | 11/2017 | Boyd | B64D 31/06 |
| 2017/0349293 A1* | 12/2017 | Klemen | B60L 50/15 |

(Continued)

*Primary Examiner* — Shafiq Mian
(74) *Attorney, Agent, or Firm* — Brinks Gilson & Lione

(57) ABSTRACT

A method for operation of a hybrid propulsion system is provided that includes providing a hybrid propulsion system including a gas turbine engine, an electrical system, and a controller configured to cause the gas turbine engine to produce a first mechanical power output and to cause the electrical system to produce a second mechanical power output. The method further includes causing the gas turbine engine to produce the first mechanical power output and causing the electrical system to produce the second mechanical power output, which causes a drive shaft of the gas turbine engine to rotate. The method further includes decreasing production of the first mechanical power output when a combination of the first mechanical power output and the second mechanical power output for take-off or climb is a predetermined percentage of a predetermined parameter of the gas turbine engine.

18 Claims, 4 Drawing Sheets

(56) References Cited

U.S. PATENT DOCUMENTS

| | | |
|---|---|---|
| 2018/0002025 A1 | 1/2018 | Lents et al. |
| 2018/0003071 A1* | 1/2018 | Lents .................... B64D 27/10 |
| 2018/0003072 A1 | 1/2018 | Lents et al. |
| 2018/0003109 A1 | 1/2018 | Lents et al. |
| 2018/0163558 A1 | 6/2018 | Vondrell et al. |
| 2018/0354635 A1* | 12/2018 | Wagner .................... F02K 5/00 |

* cited by examiner

PARALLEL HYBRID PROPULSION SYSTEM

GOVERNMENT LICENSE RIGHTS

This invention was made with government support under Prime contract NNC15BA07B, Subcontract NNC17TA42T awarded by the National Aeronautics and Space Administration (NASA). The government has certain rights in the invention.

TECHNICAL FIELD

This disclosure relates to hybrid systems and, in particular, to parallel hybrid propulsion systems.

BACKGROUND

Current parallel hybrid propulsion systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
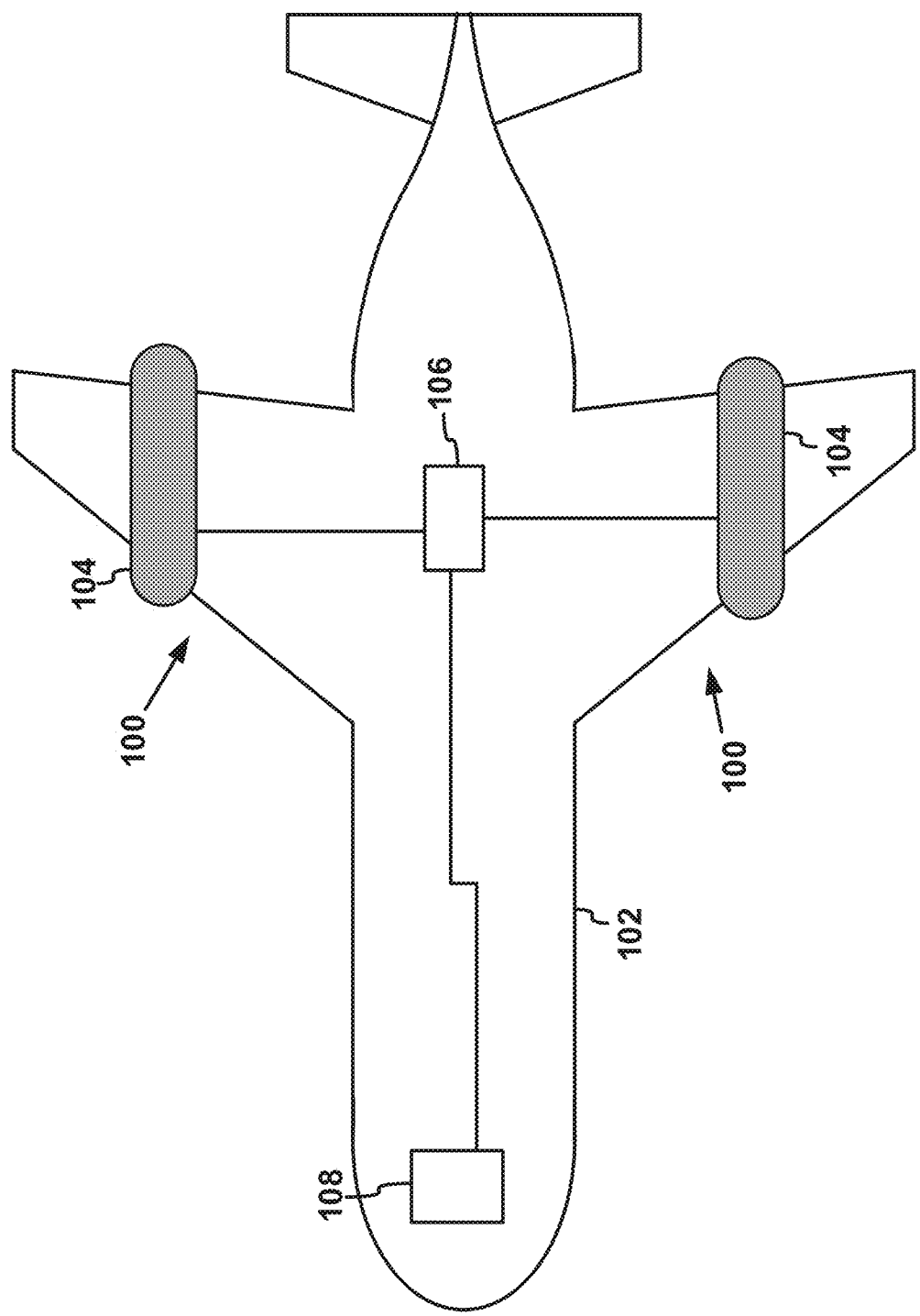
FIG. 1 illustrates a schematic view of an example of an aircraft.

In one example, a parallel hybrid propulsion system is provided that includes a gas turbine engine. The gas turbine engine includes a turbine and a combustor. The combustor is configured to receive fuel. The turbine is configured to be driven by the combustor and to produce a first mechanical power output for rotation of a drive shaft of the gas turbine engine. The system further includes an electrical system, which includes an electrical motor. The electrical motor is configured to produce a second mechanical power output for rotation of the drive shaft of the gas turbine engine. The system further includes a controller configured to cause a combination of the first mechanical power output and the second mechanical power output to be at least a predetermined mechanical power threshold for take-off or climb. The gas turbine engine has a mechanical power output capacity. The mechanical power output capacity of the gas turbine engine is greater than or equal to the predetermined mechanical power threshold for take-off or climb. The first mechanical output produced by the gas turbine engine is less than the predetermined mechanical power threshold for take-off or climb. The controller is configured to cause the electrical system to supplement the first mechanical output with the second mechanical output.

In another example, a method for operating a hybrid propulsion system is provided. A first mechanical power output is produced to rotate a drive shaft of a gas turbine engine. The first mechanical power is produced by driving a turbine of the gas turbine engine from a combustor of the gas turbine engine, the combustor burning fuel. A second mechanical power output is produced to rotate the drive shaft of the gas turbine engine by an electrical system including an electrical motor. A combination of the first mechanical power output and the second mechanical power output is caused for take-off or climb. The combination is at least a predetermined mechanical power threshold for take-off or climb. The gas turbine engine has a mechanical power output capacity. The mechanical power output capacity of the gas turbine engine is greater than or equal to the predetermined mechanical power threshold for take-off or climb. The first mechanical power output produced by the gas turbine engine is less than the predetermined mechanical power threshold for take-off or climb. The drive shaft is powered by a combination of the first mechanical power output and the second mechanical power output.

In yet another example, a method for operating a hybrid propulsion system is provided. The hybrid propulsion system is provided, which includes a gas turbine engine, an electrical system, and a controller configured to cause the gas turbine engine to produce a first mechanical power output and to cause the electrical system to produce a second mechanical power output. The gas turbine engine is caused to produce the first mechanical power output and the electrical system is caused to produce the second mechanical power output, which causes a drive shaft of the gas turbine engine to rotate. Production of the first mechanical power output is decreased when a combination of the first mechanical power output and the second mechanical power output for take-off or climb is a predetermined percentage of a predetermined parameter of the gas turbine engine.

In some examples, gas turbine engines may encounter damage and/or wear on components when operating at substantially maximal temperatures and delta temperatures, especially during take-off. Although operating at substantially maximal temperatures may optimize engine efficiency, frequent exposure to relatively high temperatures experienced at maximal temperatures may, over time, damage and/or wear down engine components, such as the components in compressor and turbine sections of the gas turbine engine. Additionally, airport operation is often a nuisance to surrounding environments and neighborhoods due to noise and emissions, particularly during aircraft take-off. Hybrid propulsion systems may help reduce noise and emissions. In the case of a hybrid propulsion system for a gas turbine engine, the hybrid propulsion system may be driven partially by fuel, like a conventional gas turbine engine, and partially by a motor powered by electricity. However, a drawback to current hybrid propulsion systems, is that such systems still require the gas turbine engine to operate at or near the gas turbine engine's temperature limitation, causing wear and tear on engine components.

One interesting feature of the systems and methods described below may be a hybrid propulsion system, which both reduces noise and emissions, and reduces wear and tear on engine components caused by exposure to substantially maximal temperatures and delta temperatures, which are changes in temperature over time. Alternatively, or in addition, an interesting feature of the systems and methods described below may be that the gas turbine engine is able to maintain an engine temperature that is lower than substantially maximal temperatures, by causing an electrical system to provide a supplementary mechanical power output during take-off and/or climb.

FIG. 1 is a non-limiting schematic example of a hybrid propulsion system 100 for propelling a vehicle. The hybrid propulsion system may be any system configured to produce a mechanical power output from mechanical power from a gas turbine engine, which runs on fuel, and/or mechanical power from an electric motor, which is powered by electricity. The hybrid propulsion system is a parallel hybrid propulsion system because the gas turbine engine and electric engine may simultaneously provide mechanical power for propulsion. In one example, as shown in FIG. 1, the vehicle is an aircraft 102. In other embodiments, the vehicle may be any type of engine-powered vehicle, including one or more types of aircraft. In various forms, the vehicle may be manned and/or autonomous. The hybrid propulsion system 100 may include a prime power engine 104 and a controller 106 configured to control the prime power engine 104.

Figure 2:
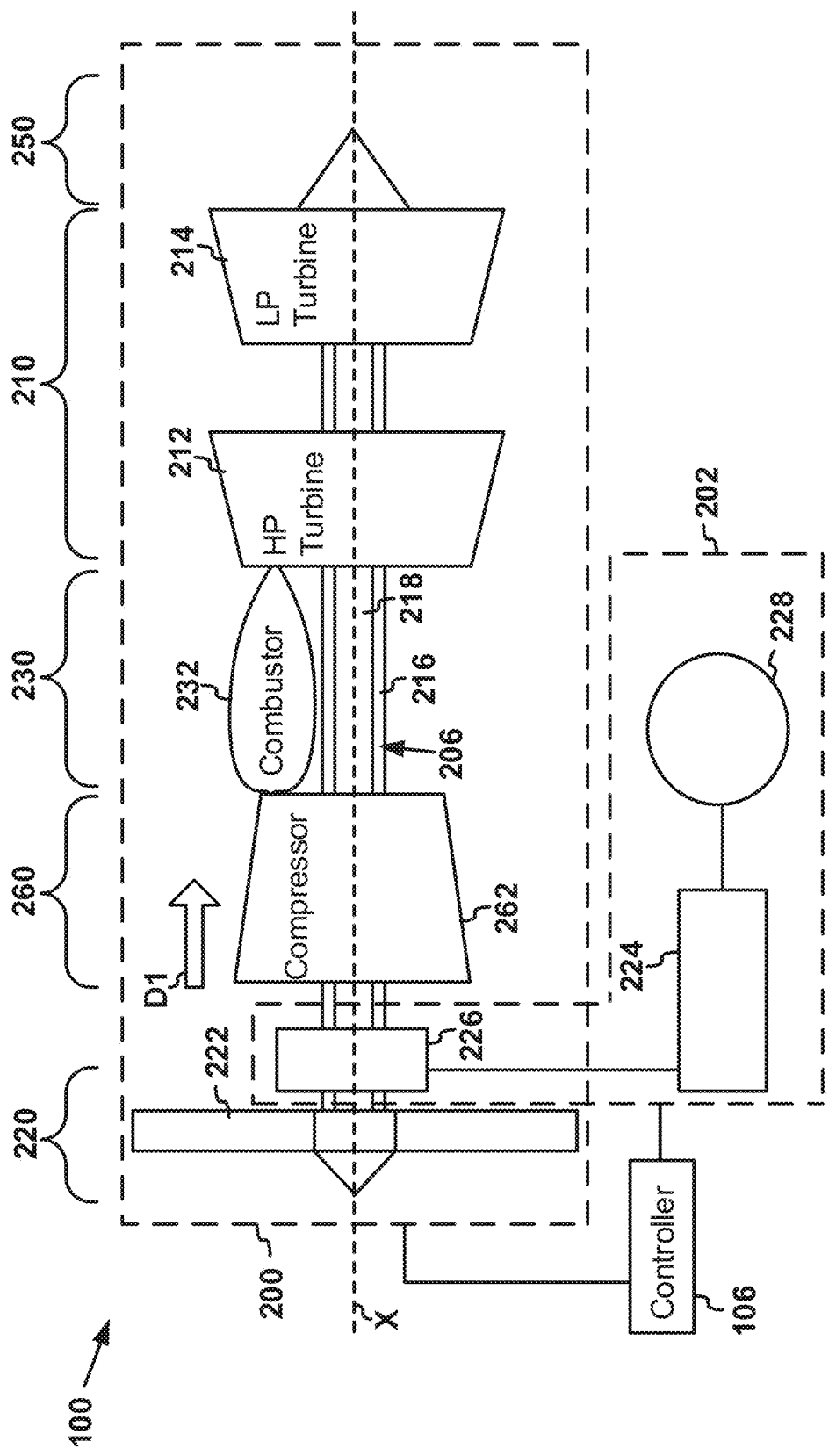
FIG. 2 illustrates a schematic view of an example of a hybrid propulsion system.

The prime power engine 104 may be any engine system that includes both a gas turbine engine 200 and an electrical system 204 (shown in FIG. 2). In the example shown in FIG. 1 the hybrid propulsion system 100 includes the prime power engine 104 in each wing of the aircraft 102. In other examples, the hybrid propulsion system 100 may include only one prime power engine 104 or more than three prime power engines 104. In some examples, the hybrid propulsion system 100 includes only one controller 106 configured to control multiple instances of the prime power engine 104 in the hybrid propulsion systems 100. In other examples, the hybrid propulsion system 100 may include multiple controllers 106, so that each wing has a respective hybrid propulsion system 100 with a respective controller 106.

The hybrid propulsion system 100 may further include a flight control system 108 in communication with the controller 106. The flight control system 108 may be any device configured to provide an input to the controller. In some examples, the flight control system 108 may be controlled by a pilot in a cockpit of the aircraft 102 providing real-time input, such as pushing a thrust lever. In other examples, a flight control system may autonomously provide input to the controller. Alternatively or in addition, the controller may be configured to function automatically without input from a flight control system 108.

The controller 106 may be any device configured to control the hybrid propulsion system 100. Examples of the controller 106 include an engine control unit (ECU) and an engine control module (ECM).

FIG. 2 is a schematic view of an example of the hybrid propulsion system 100. The illustrated example of the hybrid propulsion system 100 includes a gas turbine engine 200, an electrical system 202, and the controller 106. The illustrated example of the hybrid propulsion system 100 is a single unit that may be placed, for example, on one wing of an aircraft. In other examples, the hybrid propulsion system 100 illustrated in FIG. 2 is included in both wings of the aircraft.

The gas turbine engine 200 may take a variety of forms in various embodiments. Though depicted as an axial flow engine, in some forms the gas turbine engine 200 may have multiple spools and/or may be a centrifugal or mixed centrifugal/axial flow engine. In some forms, the gas turbine engine 200 may be a turboprop, a turbofan, or a turboshaft engine. Furthermore, the gas turbine engine 200 may be an adaptive cycle and/or variable cycle engine. Other variations are also contemplated.

In some examples, the gas turbine engine 200 may supply power to and/or provide propulsion of the aircraft 102. Alternatively or in addition, the gas turbine engine 200 may be utilized in a configuration unrelated to an aircraft such as, for example, an industrial application, an energy application, a power plant, a pumping set, a marine application (for example, for naval propulsion), a weapon system, a security system, a perimeter defense or security system. In some examples, the gas turbine engine 200 may be sized to sustain all stages of flight without assistance from the electrical system 202. Although the hybrid propulsion system 100 may be less efficient during cruise than current, down-sized hybrid propulsion systems, the hybrid propulsion system 100 is a safer alternative than systems that rely on the electrical system to maintain flight, especially, for example, in the event of a failure of the electrical system. Because of the decreased efficiency of the hybrid propulsion system 100 during cruise, the hybrid propulsion systems may be beneficial for certain applications, such as take-off and immediate landing applications.

The gas turbine engine 200 may include an intake section 220, a compressor section 260, a combustion section 230, a turbine section 210, and an exhaust section 250. The intake section 220 may include a fan 222. The compressor section 260 may include a compressor 262. The combustion section 230 may include a combustor 232. During operation of the gas turbine engine 200, fluid received from the intake section 220, such as air, travels along the direction D1 and may be compressed within the compressor section 260. The compressed fluid may then be mixed with fuel and the mixture may be burned in the combustion section 230. The combustion section 230 may include any suitable fuel injection and combustion mechanisms. The hot, high pressure fluid may then pass through the turbine section 210 to extract energy from the fluid and cause a drive shaft 206 in the turbine section 210 to rotate, which in turn drives the compressor section 260. The turbine section may include a high pressure turbine 212 and/or a low pressure turbine 214. Discharge fluid may exit the exhaust section 250.

As noted above, the hot, high pressure fluid passes through the turbine section 210 during operation of the gas turbine engine 200. As the fluid flows through the turbine section 210, the fluid passes between adjacent blades (not shown) of the high pressure turbine 212 and the low pressure turbine 214 causing the high and low pressure turbines 212, 214 to rotate. The rotating high and low pressure turbines 212, 214 turn the drive shaft 206. The blades may rotate around an axis of rotation, which may correspond to a centerline X of the gas turbine engine 200 in some examples.

The drive shaft 206 may be any shaft configured to drive rotation of the fan 222 and the low pressure compressor. In some examples, as shown in FIG. 2, the drive shaft 206 may be a low pressure shaft (LP shaft) 218 running concentrically in a high pressure shaft (HP shaft) 216. The HP shaft 216 may be coupled to the high pressure turbine 212 and is rotationally driven by the high pressure turbine 212, and the LP shaft 218 may be coupled to the low pressure turbine 214 and is rotationally driven by the low pressure turbine 214. In some examples, the compressor 262 may include a high pressure and a low pressure compressor. In such examples, the high pressure compressor is driven by the HP shaft 216, and the fan 222 and the low pressure compressor are driven by the LP shaft 218.

The electrical system 202 may be any electric powered system configured to provide mechanical power to the drive shaft 206. In the example illustrated in FIG. 2, the electrical system 202 includes an electric motor 224, a gearbox 226 coupled to the drive shaft 206 and the electric motor 224, and an electrical storage device 228 coupled to the electric motor 224. The electric motor 224 is external to the gas turbine engine 200. In other examples, the electric motor 224 may be integral to the gas turbine engine 200. For example, the electric motor 224 may include windings arranged around drive shaft 206. The electric motor 224 may be any electrical machine powered by electricity that converts electrical energy into mechanical energy. The electric motor 224 includes a rotor, a stator, and a shaft (not shown). Examples of the electric motor may include an AC motor, a DC motor, a synchronous motor, a brushless motor, and/or a brushed motor. In some examples, the electric motor 224 may be an electric machine capable of operating as a motor and/or as a generator.

The gearbox 226 may be any device that includes gears and/or a gear train. The gearbox 226 is configured to provide speed and torque conversions from a rotating power source to another device, such as a transmission system. In some examples, the electric motor 224 is coupled to the drive shaft 206 via the gearbox 226. In this example, the electric motor 224 is mounted a distance radially away from the drive shaft 206. The gearbox 226 is configured to receive mechanical power from the electric motor 224 and transfer the received mechanical power to the drive shaft 206. In other words, the gearbox 226 converts speed and torque received from rotation of a shaft of the electric motor 224 to the drive shaft 206 of the gas turbine engine 200, causing the drive shaft 206 to rotate. The electrical system may provide mechanical power to the HP shaft 216 and/or the LP shaft 218 of the gas turbine engine 200.

The electrical storage device 228 may be any device configured to store electrical energy and supply electrical energy to the electric motor 224. Examples of the electrical storage device 228 may include fuel cells, flywheels, electrochemical batteries, capacitors, double layer capacitors, and/or ultra-capacitors.

The controller 106 may be any device that performs logic operations. The controller 106 may be in communication with a memory (not shown). The controller 106 may include a controller, engine control unit (ECU), engine control module (ECM), a general processor, a central processing unit, a computing device, an application specific integrated circuit (ASIC), a digital signal processor, a field programmable gate array (FPGA), a digital circuit, an analog circuit, a microcontroller, any other type of processor, or any combination thereof. The controller 106 may include one or more elements operable to execute computer executable instruction or computer code embodied in the memory.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The gas turbine engine 200 may be configured to produce a maximum mechanical power output capacity ($P_{max}$), which is a maximum amount of mechanical power that the gas turbine engine 200 is capable of supplying to the drive shaft 206 without the gas turbine engine 200 becoming unstable. $P_{max}$ is greater than or equal to an amount of mechanical power required for take-off and/or climb.

The gas turbine engine 200 may produce a maximum efficiency mechanical power output ($P_{efficiency}$), which is an amount of power that the gas turbine engine 200 supplies to the drive shaft 206, causing the gas turbine engine to operate at maximum efficiency. In some examples, $P_{efficiency}$ may be greater than or equal to an amount of mechanical power required for take-off and/or climb. In some examples, maximum efficiency may refer to a Specific Fuel Consumption (SFC) of the gas turbine engine 200. SFC is a mass of fuel needed to provide a net thrust for a predetermined period of time. SFC may depend on several variables such as engine design, throttle setting, altitude, climate, and/or flight speed. In other examples, maximum efficiency may be a maximum fuel efficiency of the gas turbine engine 200.

The gas turbine engine 200 may be further configured to produce a cruise mechanical power output ($P_{cruise}$), which is an amount of power that the gas turbine engine 200 supplies to the drive shaft 206 during cruise.

At certain stages during flight, the gas turbine engine 200 may be at an efficiency temperature ($T_{efficiency}$), a cruise temperature ($T_{cruise}$), and/or a maximum temperature ($T_{max}$). The $T_{efficiency}$ may be a temperature of the gas turbine engine 200 when the gas turbine engine 200 is producing $P_{efficiency}$. The $T_{cruise}$ may be a temperature of the gas turbine engine 200 when the gas turbine engine 200 is producing $P_{cruise}$. The $T_{max}$ may be a temperature of the gas turbine engine 200 when the gas turbine engine 200 is producing $P_{max}$. The $T_{efficiency}$, $T_{cruise}$, and/or $T_{max}$, may vary depending on flight conditions, such as air condition, altitude, and/or elevation of take-off location. The temperatures of the gas turbine engine 200 may be directly dependent on an amount of power produced by the gas turbine engine 200. In other words, as the power output of the gas turbine engine 200 increases, the temperature of the gas turbine engine 200 also increases.

At any given time during operation, the gas turbine engine 200 may have a rotor inlet temperature ($T_{rit}$) or a combustion section outlet temperature, which may be indicative of a temperature of the gas exiting the combustion section and entering the high pressure turbine section. As used herein, the temperature of the gas turbine engine 200 refers to the rotor inlet temperature.

In traditional gas turbine systems, during take-off and/or climb, the $T_{rit}$ may be substantially equal to the $T_{efficiency}$. Take-off may be a phase of flight in which an aircraft transitions from traveling on the ground to flying in the air. Climb may be another phase of flight in which the aircraft climbs to higher altitudes. Climb may occur immediately after take-off and/or intermittently during cruise as needed. Cruise may be yet another phase of flight in which the aircraft remains at substantially consistent speeds and/or altitudes. A typical range of altitudes for cruise may be 33,000 feet to 42,000 feet. During cruise, the traditional systems operate at $T_{cruise}$, which is lower than $T_{efficiency}$. When operating at $T_{efficiency}$, the gas turbine engine 200 is subject to relatively high temperatures. Over time, this high-temperature exposure may damage components of the gas turbine engine 200 decreasing the life of the engine. Current hybrid propulsion systems exacerbate this problem. In current hybrid propulsion systems, in order to increase engine efficiency during cruise conditions, gas turbine engines operate at $T_{efficiency}$ throughout flight, during cruise as well as during take-off and/or climb. Therefore, current hybrid propulsion systems experience increased exposure to high temperatures compared to traditional gas turbine systems. The hybrid propulsion system 100 described herein may operate the gas turbine engine 200 during take-off and/or climb such that $T_{rit}$ is less than $T_{efficiency}$. In some examples, $T_{rit}$ is substantially equal to $T_{cruise}$. In other words, the power supplied by the gas turbine engine 200 to the drive shaft 206 during take-off and/or climb is less than or equal to the power supplied by the gas turbine engine 200 to the drive shaft 206 during cruise. In order to prevent a loss in thrust during take-off and/or climb, the power supplied by the gas turbine engine 200 may be supplemented by the electrical system 202 as described herein. Thrust may be any force generated by the hybrid propulsion system that causes an aircraft to move through the air and to overcome the drag of the aircraft.

In one example of the hybrid propulsion system 100, the electrical system 202 may be coupled to the drive shaft 206. In this example, the gas turbine engine 200 is configured to supply a first mechanical power output to the drive shaft 206 for rotation of the drive shaft 206. The electrical system 202 is configured to supply a second mechanical power output to the drive shaft 206 for rotation of the drive shaft 206. In this example, the flight control system 108 may set a predetermined mechanical power threshold of the hybrid propulsion system 100 for take-off and/or climb. The predetermined mechanical power threshold may be a predetermined amount of power needed to produce a sufficient thrust for take-off and/or climb. The predetermined amount of power may be determined by the flight control system 108, the controller 106, or any other component. In this example, the controller 106 may be configured to cause a combination of the first mechanical power output and the second mechanical power output to be produced. The combination of the first mechanical power output and the second mechanical power output may be greater than or equal to the predetermined mechanical power threshold.

The first mechanical power output may be any power produced by the gas turbine engine 200 that causes the drive shaft 206 to rotate. For example, the first mechanical power output may be indicative of a total power output produced by the gas turbine engine 200 during any stage of flight, such as during take-off, climb, and/or cruise. In another example, the first mechanical power output may be an instantaneous mechanical power produced by the gas turbine engine 200 at a point during any stage of flight. In yet another example, the first mechanical power output may be indicative of an average mechanical power output of the gas turbine engine 200 over a predetermined period of time.

The second mechanical power output may be any mechanical power produced by the electrical system 202 that causes the drive shaft 206 to rotate. For example, the second mechanical power output may be indicative of an instantaneous mechanical power produced by the electrical system 202 at a point during any stage of flight. In yet another example, the second mechanical power output may be indicative of an average mechanical power output of the electrical system 202 over a predetermined period of time.

In some examples, a ratio (P1:P2) of the first mechanical power output (P1) to the second mechanical power output (P2) during take-off or climb may be between 1:2 and 2:1 inclusively. In other examples, the ratio P1:P2 may be different, depending on airframe needs, the selected hybrid architecture and/or the desired split between the first and the second mechanical power outputs.

During take-off and/or climb, the flight control system 108 may provide an input, such as the predetermined mechanical power threshold, to the controller 106. Based on the input received, the controller 106 causes the gas turbine engine 200 to produce the first mechanical power output. In some examples the controller 106 limits an amount of power the gas turbine engine 200 produces. In this example, the controller 106 causes the first mechanical power output to be substantially equal to the $P_{cruise}$. In other examples, the controller may limit the temperature of gas turbine engine 200 to be at or about $T_{cruise}$. The controller 106 causes the electrical system 202 to produce the second mechanical power output. Because the controller 106 may cause the gas turbine engine 200 to operate at temperatures and/or power outputs that are less than $T_{efficiency}$ and $P_{efficiency}$, respectively, the gas turbine engine 200 alone may not produce sufficient power for take-off. The controller 106 causes the electrical system 202 to produce the second mechanical power output to supplement the first mechanical power output, such that the combination of the first mechanical power output and the second mechanical power output is greater than or equal to the predetermined mechanical power threshold. In some examples, the gas turbine engine 200 may supply between fifty to one hundred percent of the power output required for take-off, climb, and/or cruise. In other examples, the gas turbine engine 200 may supply one hundred percent of the power output required for take-off, ninety percent of the power output required for climb, and between fifty to seventy percent of the power output required for cruise. The amount of power output supplied by the gas turbine engine 200 may depend on variables, such as the airframe, the nature of the mission, and/or the environment.

In another example, during take-off and/or climb, the controller 106 may be configured to first cause the electrical system 202 to produce the second mechanical power output. In this example, the controller 106 is configured to cause the gas turbine engine 200 to produce the first mechanical power output to supplement the second mechanical power output. In other examples, the controller 106 may cause the gas turbine engine 200 and the electrical system 202 to produce the first and second mechanical power outputs, respectively, simultaneously. In this example, the controller may cause the gas turbine engine 200 to reduce production of the first mechanical power output as the combination of the first mechanical power output and the second mechanical output approaches, reaches, and/or exceeds the predetermined mechanical power threshold. In some examples, when production of the first mechanical power output is decreased, the controller may cause the electrical system 202 to increase production of the second mechanical power output, so that the combination of the first and second mechanical power outputs remains greater than or equal to the predetermined mechanical power threshold.

Alternatively or in addition to the predetermined mechanical power threshold, the flight control system may set a rating for flight. The rating may be any parameter that is an input for the controller 106. In one example the rating may be a take-off rating and/or a climb rating. When the take-off rating and/or the climb rating is selected, the controller 106 may cause the gas turbine engine 200 and the electrical system 202 to produce the combination of the first mechanical power output and the second mechanical power output. In another example, the parameter for the rating may be a predetermined temperature threshold for the gas turbine engine 200. In one example, the predetermined temperature threshold may be substantially equal to $T_{cruise}$. In another example, the predetermined temperature threshold may substantially equal to $T_{efficiency}$. In further examples, the predetermined temperature threshold may be less than or equal to ninety-nine percent of $T_{efficiency}$. In some examples, a benefit to the life of the hybrid propulsion system 100 may occur from as small as a one-percent reduction in $T_{rit}$.

The controller 106 may cause the gas turbine engine 200 to decrease the first mechanical power output when $T_{rit}$ and/or any other temperature of the gas turbine engine 200 approaches the predetermined temperature threshold. For example, the controller 106 may cause the gas turbine engine 200 to decrease the first mechanical output for a number of minutes (Z) causing a change in $T_{rit}$, or delta temperature (D). In some examples, Z and D may vary depending on parameters of the electrical system 202, the parameters including, for example, an amount of stored electrical energy, a power rating of the electrical storage device 228, a power rating of the electric motor 224, and/or an ability of the electrical system 202 to supply the second mechanical power output to the drive shaft 206. In some examples, the controller 106 may prevent the gas turbine engine from exceeding the temperature threshold, by causing a decrease in the first mechanical power output. The controller 106 may be configured to perform an increasing and/or decreasing of the first mechanical power output and/or the second mechanical power output regardless of which parameter is selected for the rating. Other examples of parameters of the rating may include rate of climb, altitude, power output, rotational speed of the drive shaft 206 or combinations thereof.

The controller 106 may be configured to receive and/or transmit information, such as a temperature of the gas turbine engine 200, rotational speed of the drive shaft 206, rate of climb, altitude, and/or values indicative of the first mechanical power output, the second mechanical power output, and/or a combination of the first and second mechanical power outputs. In some examples the controller 106 and/or a sensor of the controller 106, may be configured to monitor a percentage of threshold of the gas turbine engine 200. The percentage of threshold may be a power output threshold percentage and/or a temperature threshold percentage. The power output threshold percentage may be a sensed and/or measured power output of the first mechanical power output divided by $P_{capacity}$. Likewise, the temperature threshold percentage may be a sensed and/or measured temperature of the gas turbine engine 200 divided by a predetermined temperature threshold.

In one example, the rating may be the percentage of threshold of the gas turbine engine 200. In this example, the controller 106 may be configured to cause an increase and/or decrease in the first mechanical power output based on the proximity of the sensed power output or the sensed temperature to the predetermined power output or predetermined temperature thresholds. For example, when the sensed or measured temperature of the gas turbine engine 200 is between seventy to ninety percent of the predetermined temperature threshold, the controller 106 may cause the gas turbine engine 200 to decrease the first mechanical power output, so that the temperature of the gas turbine engine 200 does not exceed the predetermined temperature threshold.

Alternatively or in addition, the controller may be configured to monitor an efficiency threshold percentage and/or a cruise threshold percentage. In some examples, the sensed and/or measured temperature may be indicative of an instantaneous temperature of the gas turbine engine 200. In other examples, the sensed and/or measured temperature may be indicative of an average temperature over a predetermined period of time. In some examples, the sensed and/or measured power output may be indicative of an instantaneous power output of the gas turbine engine 200. In other examples, the sensed and/or measured power output may be indicative of an average power output over a predetermined period of time.

Figure 3:
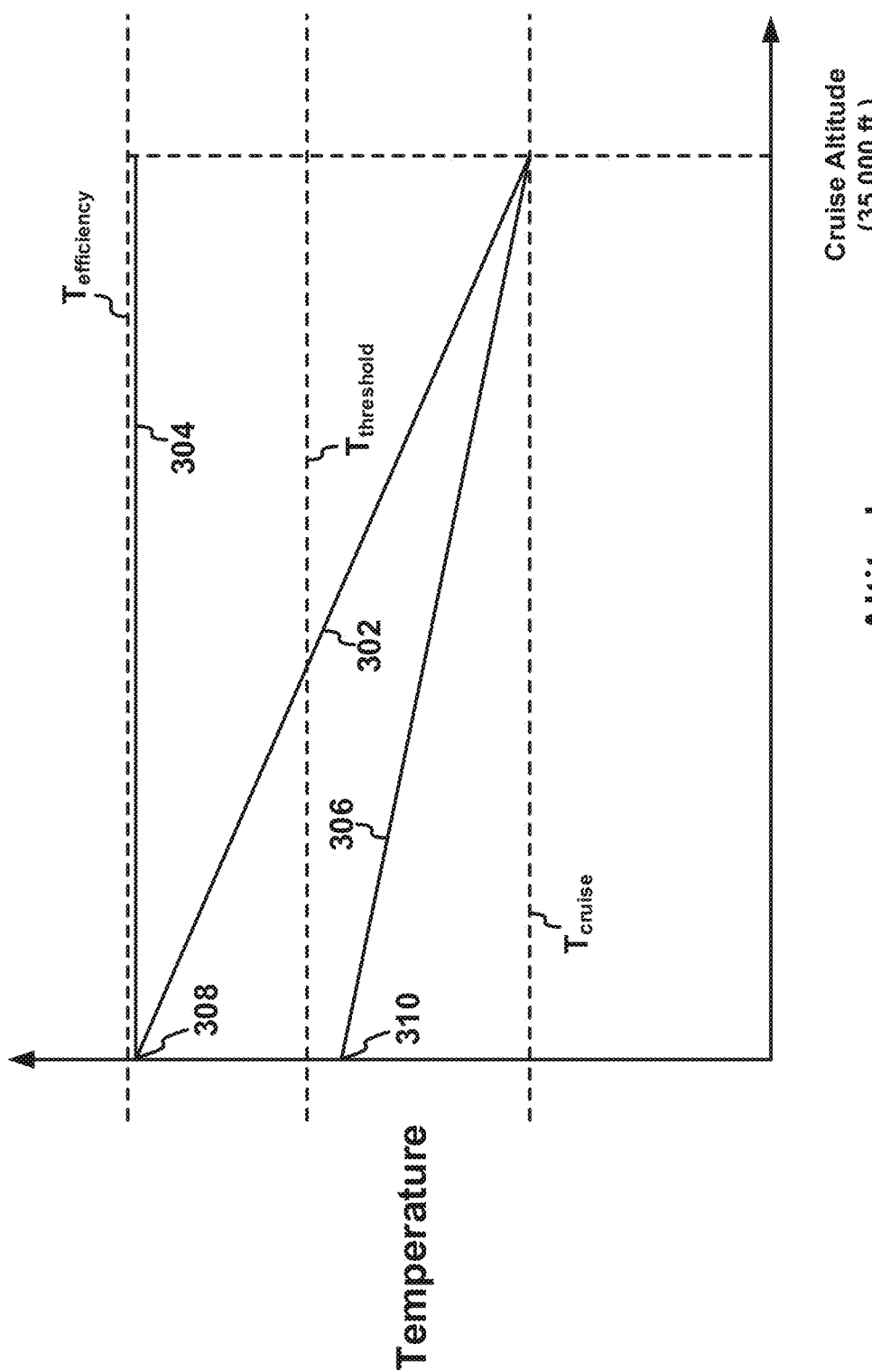
FIG. 3 illustrates a graphical diagram of an example of operating conditions of the hybrid propulsion system.

FIG. 3 illustrates a graphical example comparing the novel hybrid propulsion system 100 described herein to traditional turbofan systems and current hybrid propulsion systems. As shown in FIG. 3, three lines, labeled 302, 304, 306, indicate the performance of traditional turbofan systems 302, the performance of current hybrid propulsion systems 304, and the performance of the novel hybrid propulsion system 306, respectively. Point 308 represents the traditional turbofan systems and current hybrid propulsion systems during take-off and/or climb. As shown by the traditional turbofan system line 302, traditional turbofan systems operate at or near $T_{efficiency}$ at take-off and/or climb. As altitude increases, the temperature of the traditional turbofan system may decreases until the aircraft reaches cruise at which point the traditional turbofan system may operate at $T_{cruise}$. As shown by the current hybrid propulsion systems line 304, the current hybrid propulsion system operates at or near $T_{efficiency}$ throughout take-off, climb, and cruise. Point 310 represents the hybrid propulsion system 100 during take-off and/or climb. As shown by the hybrid propulsion system line 306, the hybrid propulsion system 100 may operate below a temperature threshold ($T_{threshold}$) during take-off, climb, and cruise. In some examples, the temperature threshold may be a predetermined temperature set by the flight control system. Alternatively or in addition, the temperature threshold may be a temperature at which wear and/or damage to engine components may begin to occur. As shown in FIG. 3, traditional systems operate above $T_{threshold}$ for a portion of take-off and/or climb, which exposes the traditional systems to damaging temperatures and delta temperatures. Additionally, current hybrid propulsion systems operate exclusively above $T_{threshold}$ during take-off, climb, and cruise, causing even more exposure to damaging temperatures than the traditional systems.

Figure 4:
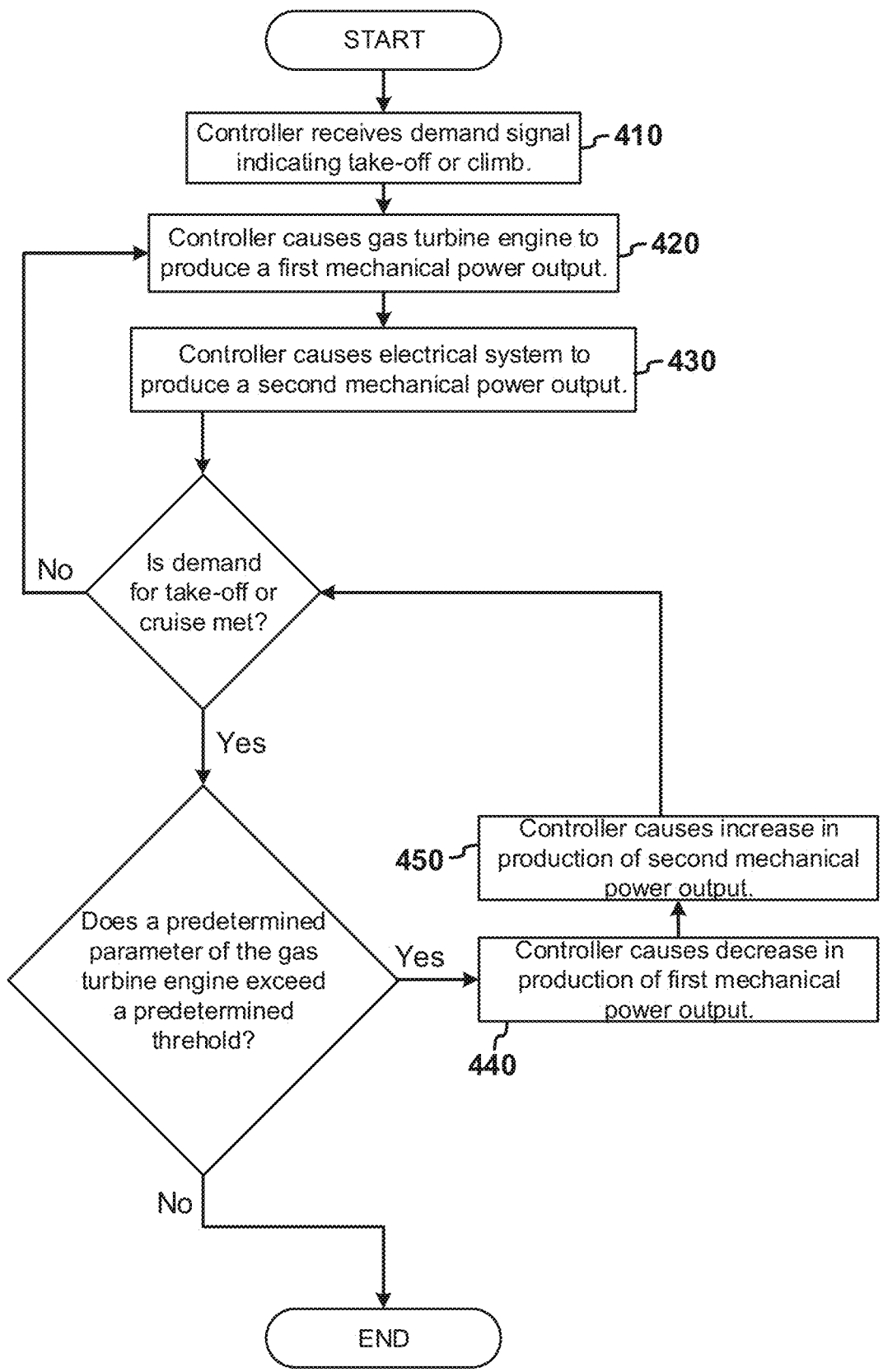
FIG. 4 illustrates a flow diagram of example logic for a controller in the hybrid propulsion system.

FIG. 4 is a flow diagram of example logic for the controller 106 in the hybrid propulsion system 100. In this example, the controller 106 receives (410) a demand signal, for example, from the flight control system 108. In response, the controller 106 causes (420) the gas turbine engine 200 to produce the first mechanical power output. The controller 106 causes (430) the electrical system 202 to produce the second mechanical power output. If a demand for take-off and/or cruise is not met, the controller 106 causes increased production of the first mechanical power output (420) and/or the second mechanical power output (430). If a demand for take-off and/or cruise is met, the controller 106 determines if a predetermined parameter, such as power, temperature, delta power, and/or delta temperatures of the gas turbine engine 200 exceeds a predetermined threshold of the predetermined parameter. If the predetermined parameter of the gas turbine engine 200 exceeds the predetermined threshold, the controller 106 causes (440) the gas turbine engine 200 to decrease or limit production of the first mechanical power output. The controller 106 causes (450) the electrical system to increase production of the second mechanical output so that the demand for take-off and/or cruise is met.

The operations of the controller 106 may include additional, fewer, or different operations than shown in FIG. 4. Alternatively or in addition, the operations may be performed in a different order than the order shown in FIG. 4. For example, the controller 106 may cause (420) production of the first mechanical power output before the controller 106 causes (430) production of the second mechanical power output. In other examples, the controller 106 may cause (430) production of the second mechanical power output before the controller causes (420) production of the first mechanical power output. In yet another example, the controller may cause production (420) of the first mechanical power output and production (430) of the second mechanical power output simultaneously. Alternatively or in addition, the controller 106 may cause (450) an increase in the production of the second mechanical power output before the controller 106 causes (440) a decrease in the first mechanical power output. In another example, the controller 106 may cause a decrease (440) in production of the first mechanical power output and an increase (450) in production of the second mechanical power output simultaneously.

Each component may include additional, different, or fewer components. For example, the electrical system 202 may only include the electric motor 224. As shown in FIG. 1, the hybrid propulsion system 100 may be included in both wings of the aircraft 102. In other examples, the hybrid propulsion system 100 may be included in only one wing or in a body of the aircraft.

The hybrid propulsion system 100 may be implemented with additional, different, or fewer components. For example, the hybrid propulsion system 100 may include only the gas turbine engine 200 and the electrical system 202. As another example, the hybrid propulsion system 100 may include a sensor positioned within the gas turbine engine 200 and configured to measure a temperature therein and to communicate the measured temperature with the controller 106.

The electrical system 202 may further include an electric generator. The electric generator may be any device configured to transform mechanical energy received into electrical energy. The electric generator may be configured to receive mechanical energy from the drive shaft 206. The electric generator may be further configured to provide electrical energy to the electric storage 228.

The controller 106 may be configured to optimize energy usage of the hybrid propulsion system 100. The controller 106 may be configured to control the hybrid propulsion system such that hybrid propulsion system has lower emissions, such as NOx, and/or less environmental noise than traditional turbofan systems.

The methods, systems, and devices described above may be implemented in many different ways and in many different combinations of hardware and software. For example, the controller 106 may be circuitry that includes a processor that may execute instructions. Examples of the controller 106 include a Central Processing Unit (CPU), a microcontroller, or a microprocessor, an Application Specific Integrated Circuit (ASIC), a Programmable Logic Device (PLD), a Field Programmable Gate Array (FPGA) or circuitry that includes discrete logic or other circuit components, including analog circuit components, digital circuit components or both. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access the instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Hard Disk Drive (HDD), or other magnetic or optical disk; or in or on another machine-readable medium. A product, such as a computer program product, may include a storage medium and instructions stored in or on the medium, and the instructions when executed by the circuitry in the controller 106 may cause the controller 106 to implement any of the processing described above.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a hybrid propulsion system comprising: a gas turbine engine including a turbine and a combustor, the combustor configured to receive fuel, the turbine configured to be driven by the combustor and to produce a first mechanical power output for rotation of a drive shaft of the gas turbine engine; an electrical system including an electrical motor, the electrical motor configured to produce a second mechanical power output for rotation of the drive shaft of the gas turbine engine; and a controller configured to cause, for take-off or climb of an aircraft, a combination of the first mechanical power output and the second mechanical power output to be at least a predetermined mechanical power threshold for take-off or climb, wherein the gas turbine engine has a mechanical power output capacity, wherein the mechanical power output capacity of the gas turbine engine is greater than or equal to the predetermined mechanical power threshold for take-off or climb, wherein the first mechanical power output produced by the gas turbine engine is less than the predetermined mechanical power threshold for take-off or climb, wherein the controller is configured to cause the electrical system to supplement the first mechanical power output with the second mechanical power output.

A second aspect relates to the hybrid propulsion system of aspect 1, wherein a ratio of the first mechanical power output to the second mechanical power output during take-off or climb is between 1:2 and 2:1, inclusively.

A third aspect relates to the hybrid propulsion system of any preceding aspect, wherein the electric motor is integral with the gas turbine engine.

A fourth aspect relates to the hybrid propulsion system of any preceding aspect, wherein the controller is configured to cause gas turbine engine to decrease production of the first mechanical power output in response to a determination that a predetermined parameter is a predetermined threshold.

A fifth aspect relates to the hybrid propulsion system of any preceding aspect, wherein the predetermined parameter is a delta temperature of the gas turbine engine.

A sixth aspect relates to a method comprising: producing a first mechanical power output to rotate a drive shaft of a gas turbine engine by driving a turbine of the gas turbine engine from a combustor of the gas turbine engine, the combustor burning fuel; producing a second mechanical power output to rotate the drive shaft of the gas turbine engine by an electrical system including an electrical motor; and causing, for take-off or climb of an aircraft, a combination of the first mechanical power output and the second mechanical power output to be at least a predetermined mechanical power threshold for take-off or climb, wherein the gas turbine engine has a mechanical power output capacity, wherein the mechanical power output capacity of the gas turbine engine is greater than or equal to the predetermined mechanical power threshold for take-off or climb, wherein the first mechanical power output produced by the gas turbine engine is less than the predetermined mechanical power threshold for take-off or climb, the drive shaft is powered by a combination of the first mechanical power output and the second mechanical power output.

A seventh aspect relates to the method of aspect 6, further comprising causing the gas turbine engine to decrease production of first mechanical power output in response to a determination that a predetermined parameter of the gas turbine engine is a predetermined percentage of a predetermined threshold.

An eighth aspect relates to the method of any preceding aspect, wherein the predetermined parameter is indicative of a temperature of the gas turbine engine.

A ninth aspect relates to the method of any preceding aspect, wherein the predetermined parameter is indicative of a power output of the gas turbine engine.

A tenth aspect relates to the method of any preceding aspect, wherein the predetermined parameter is indicative of a rate of climb of an aircraft.

An eleventh aspect relates to the method of any preceding aspect, wherein the predetermined percentage is in a range of seventy to ninety percent.

A twelfth aspect relates to the method of any preceding aspect, further comprising decreasing production of the of first mechanical output for a number of minutes during take-off or climb, causing a change in a rotor inlet temperature of the gas turbine engine.

A thirteenth aspect relates to the method of any preceding aspect, wherein the causing the gas turbine engine to decrease production of the first mechanical power output when the predetermined parameter is a predetermined percentage of the threshold further comprises causing the electrical system to increase production of the second mechanical power output, so that a combination of the first mechanical power output and the second mechanical power output is greater than or equal to a predetermined mechanical power threshold for take-off or climb.

A fourteenth aspect relates to a method comprising: providing a hybrid propulsion system including a gas turbine engine, an electrical system, and a controller configured to cause the gas turbine engine to produce a first mechanical power output and to cause the electrical system to produce a second mechanical power output; causing the gas turbine engine to produce the first mechanical power output and causing the electrical system to produce the second mechanical power output, which causes a drive shaft of the gas turbine engine to rotate; and decreasing production of the first mechanical power output when a combination of the first mechanical power output and the second mechanical power output for take-off or climb is a predetermined percentage of a predetermined parameter of the gas turbine engine.

A fifteenth aspect relates to the method of aspect 14, wherein the predetermined parameter is a power output of the gas turbine engine, wherein the predetermined percentage is in a range of seventy to ninety percent.

A sixteenth aspect relates to the method of any preceding aspect, wherein the predetermined parameter is a temperature of the gas turbine engine, wherein the predetermined percentage is in a range of seventy to ninety percent.

A seventeenth aspect relates to the method of any preceding aspect, wherein the predetermined parameter is a rotational speed of the drive shaft.

An eighteenth aspect relates to the method of any preceding aspect, wherein the decreasing production of the first mechanical power output further comprises increasing the production of the second mechanical power output so that the combination of the first mechanical power output and the second mechanical power output during take-off or climb is greater than or equal to a predetermined mechanical power threshold needed for take-off or climb.

A nineteenth aspect relates to the method of any preceding aspect, further comprising decreasing production of the first mechanical power output for a number of minutes, causing a change in a rotor inlet temperature of the gas turbine engine.

A twentieth aspect relates to the method of any preceding aspect, wherein a ratio of the first mechanical power output to the second mechanical power output in the combination of the first mechanical power output and the second mechanical power output is between 1:2 and 2:1, inclusively.

In addition to the features mentioned in each of the independent aspects enumerated above, some examples may show, alone or in combination, the optional features mentioned in the dependent aspects and/or as disclosed in the description above and shown in the figures.

What is claimed is:
1. A hybrid propulsion system comprising:
a gas turbine engine including a turbine and a combustor, the combustor configured to receive fuel, the turbine configured to be driven by the combustor and to produce a first mechanical power output for rotation of a drive shaft of the gas turbine engine;
an electrical system including an electrical motor, the electrical motor configured to produce a second mechanical power output for rotation of the drive shaft of the gas turbine engine; and
a controller configured to:
cause, for take-off or climb of an aircraft, a combination of the first mechanical power output and the second mechanical power output to be at least a predetermined mechanical power threshold for take-off or climb, wherein the gas turbine engine has a mechanical power output capacity, wherein the mechanical power output capacity of the gas turbine engine is greater than or equal to the predetermined mechanical power threshold for take-off or climb, wherein the first mechanical power output produced by the gas turbine engine is less than the predetermined mechanical power threshold for take-off or climb;

cause the electrical system to supplement the first mechanical power output with the second mechanical power output; and cause the gas turbine engine to decrease production of the first mechanical power output in response to a determination that a temperature of the gas turbine engine has reached a predetermined temperature threshold.

2. The hybrid propulsion system of claim 1, wherein a ratio of the first mechanical power output to the second mechanical power output during take-off or climb is between 1:2 and 2:1, inclusively.

3. The hybrid propulsion system of claim 1, wherein the electric motor comprises windings that are arranged around the drive shaft.

4. The hybrid propulsion system of claim 1, wherein the predetermined temperature threshold comprises a delta temperature of the gas turbine engine.

5. A method comprising:
producing a first mechanical power output to rotate a drive shaft of a gas turbine engine by driving a turbine of the gas turbine engine from a combustor of the gas turbine engine, the combustor burning fuel;
producing a second mechanical power output to rotate the drive shaft of the gas turbine engine by an electrical system including an electrical motor;
causing, for take-off or climb of an aircraft, a combination of the first mechanical power output and the second mechanical power output to be at least a predetermined mechanical power threshold for take-off or climb, wherein the gas turbine engine has a mechanical power output capacity, wherein the mechanical power output capacity of the gas turbine engine is greater than or equal to the predetermined mechanical power threshold for take-off or climb, wherein the first mechanical power output produced by the gas turbine engine is less than the predetermined mechanical power threshold for take-off or climb, the drive shaft is powered by a combination of the first mechanical power output and the second mechanical power output; and
decreasing production of the of first mechanical output for a number of minutes during take-off or climb, causing a change in a rotor inlet temperature of the gas turbine engine.

6. The method of claim 5, further comprising causing the gas turbine engine to decrease production of the first mechanical power output in response to a determination that a predetermined parameter of the gas turbine engine is a predetermined percentage of a predetermined threshold.

7. The method of claim 6, wherein the predetermined parameter is indicative of a temperature of the gas turbine engine.

8. The method of claim 6, wherein the predetermined parameter is indicative of a power output of the gas turbine engine.

9. The method of claim 6, wherein the predetermined parameter is indicative of a rate of climb of an aircraft.

10. The method of claim 6, wherein the predetermined percentage is in a range of seventy to ninety percent.

11. The method of claim 5, wherein causing the gas turbine engine to decrease production of the first mechanical power output when the predetermined parameter is a predetermined percentage of the threshold further comprises causing the electrical system to increase production of the second mechanical power output, so that a combination of the first mechanical power output and the second mechanical power output is greater than or equal to a predetermined mechanical power threshold for take-off or climb.

12. A method comprising:
providing a hybrid propulsion system including a gas turbine engine, an electrical system, and a controller configured to cause the gas turbine engine to produce a first mechanical power output and to cause the electrical system to produce a second mechanical power output;
causing the gas turbine engine to produce the first mechanical power output and causing the electrical system to produce the second mechanical power output, which causes a drive shaft of the gas turbine engine to rotate;
decreasing production of the first mechanical power output for a number of minutes to cause a change in a rotor inlet temperature when a combination of the first mechanical power output and the second mechanical power output for take-off or climb is a predetermined percentage of a predetermined parameter of the gas turbine engine.

13. The method of claim 12, wherein the predetermined parameter is a power output of the gas turbine engine, wherein the predetermined percentage is in a range of seventy to ninety percent.

14. The method of claim 12, wherein the predetermined parameter is a temperature of the gas turbine engine, wherein the predetermined percentage is in a range of seventy to ninety percent.

15. The method of claim 12, wherein the predetermined parameter is a rotational speed of the drive shaft.

16. The method of claim 12, wherein the decreasing production of the first mechanical power output further comprises increasing the production of the second mechanical power output so that the combination of the first mechanical power output and the second mechanical power output during take-off or climb is greater than or equal to a predetermined mechanical power threshold needed for take-off or climb.

17. The method of claim 12, wherein a ratio of the first mechanical power output to the second mechanical power output in the combination of the first mechanical power output and the second mechanical power output is between 1:2 and 2:1, inclusively.

18. The hybrid propulsion system of claim 1, wherein when the controller causes the gas turbine engine to decrease production of the first mechanical power output, the controller is further configured to cause the electrical system to increase production of the second mechanical power output, so that the combination of the first mechanical power output and the second mechanical power output is greater than or equal to the predetermined mechanical power threshold for take-off or climb.

* * * * *